United States Patent
Nervo et al.

(10) Patent No.: US 6,625,228 B1
(45) Date of Patent: Sep. 23, 2003

(54) METHOD OF AND A DEVICE FOR DIGITAL SIGNAL TRANSMISSION

(75) Inventors: Giacolino Nervo, Sommariva Perno (IT); Roberto Quasso, Turin (IT)

(73) Assignee: Telecom Italia Lab S.p.A., Turin (IT)

(*) Notice: Subject to any disclaimer, the term of this patent is extended or adjusted under 35 U.S.C. 154(b) by 0 days.

(21) Appl. No.: 09/475,937

(22) Filed: Dec. 30, 1999

(30) Foreign Application Priority Data

Jan. 27, 1999 (IT) .......................................... TO99A0059

(51) Int. Cl.$^7$ ................................................ H04L 27/20
(52) U.S. Cl. ........................ 375/295; 370/536; 370/537
(58) Field of Search ................................. 375/259, 260, 375/295, 354, 363, 365, 366, 368; 370/467, 279, 468, 278, 282, 503, 505, 506, 508, 509, 513, 535, 536, 537, 538, 540, 230, 235, 394

(56) References Cited

U.S. PATENT DOCUMENTS

| | | | |
|---|---|---|---|
| 4,667,324 A | * 5/1987 | Graves | 370/538 |
| 5,274,680 A | * 12/1993 | Sorton et al. | 375/371 |
| 5,617,417 A | * 4/1997 | Sathe et al. | 370/394 |
| 5,987,080 A | * 11/1999 | Berghager et al. | 375/354 |
| 6,002,670 A | * 12/1999 | Rahman et al. | 370/238 |
| 6,148,010 A | * 11/2000 | Sutton et al. | 370/536 |
| 6,205,142 B1 | * 3/2001 | Vallee | 370/394 |

FOREIGN PATENT DOCUMENTS

| | | |
|---|---|---|
| JP | 277829 | 12/1987 |
| JP | 76649 | 4/1988 |
| JP | 184145 | 1/1989 |
| JP | 104344 | 5/1991 |
| JP | 108241 | 4/1992 |
| JP | 264843 | 9/1992 |
| JP | 188882 | 4/1994 |

* cited by examiner

*Primary Examiner*—Chi Pham
*Assistant Examiner*—Khanh Cong Tran
(74) *Attorney, Agent, or Firm*—Herbert Dubno

(57) ABSTRACT

A stream of incoming digital signals ($I_a$) is split (10) into a plurality of derived streams ($I_b$) that are sent over respective transmission links (R). The derived streams transmitted in this way ($I_c$) are then bundled again (20) to form a stream of outgoing digital signals ($I_d$). At the transmission end, symbols are inserted into the derived streams ($I_b$) simultaneously and at constant intervals (T), in order to subdivide the transmitted information into packets of equal duration and aligned in time when being transmitted. At the reception end, the above symbols associated to the transmitted derived streams ($I_c$) are generally time-shifted as a consequence of the transmission over the various transmission links (R). At the reception end (20) the time alignment of the above symbols is recovered so as to recover the time alignment of the various transmitted derived streams ($I_c$), so that the subsequent bundling can take place on the streams correctly time-aligned.

11 Claims, 4 Drawing Sheets

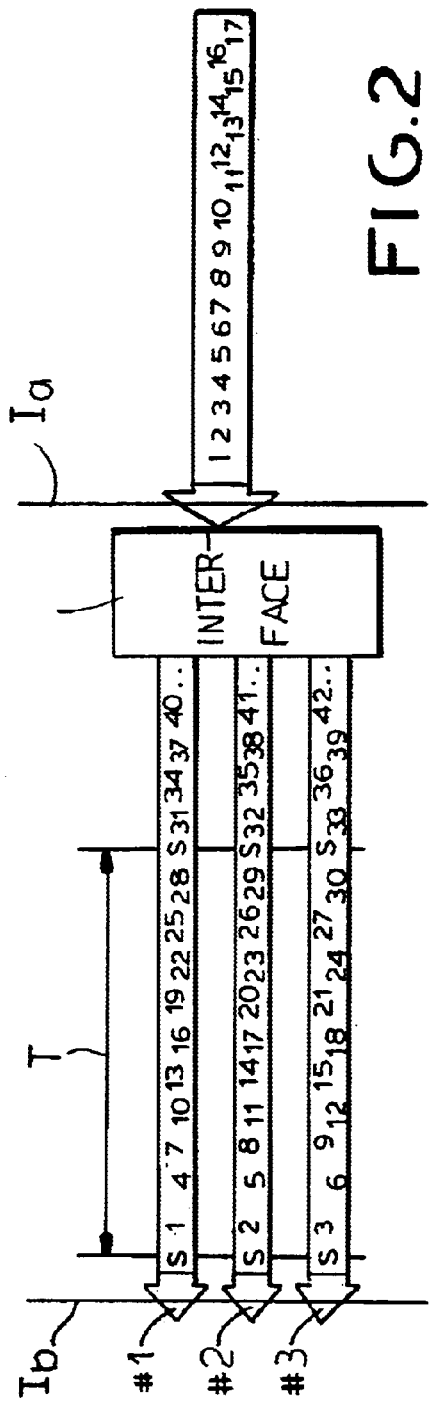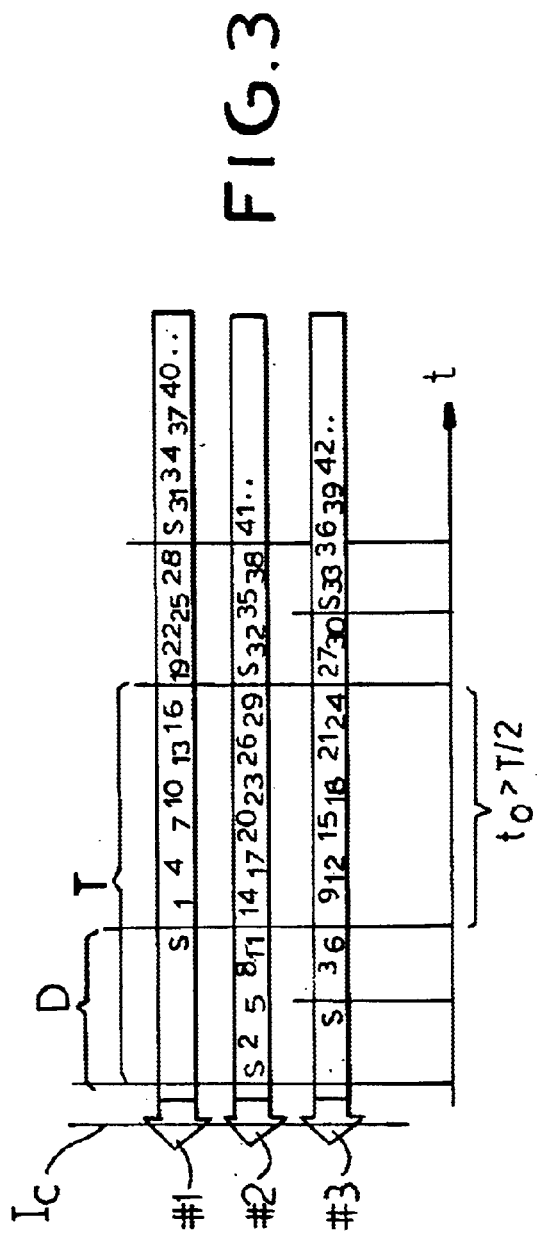

METHOD OF AND A DEVICE FOR DIGITAL SIGNAL TRANSMISSION

The present invention relates to the transmission of digital signals and faces the problem of transferring a digital stream by subdividing it into a plurality of streams at lower bit rate (hereinafter referred to as derived streams) transmitted in parallel over respective transmission links each exhibiting a respective pass band lower than that of the overall stream to be transmitted.

This subdivision of a stream into lower bit-rate streams transmitted in parallel is known in the art as "inverse multiplexing".

A solution of this type is applicable, for instance, to the transmission of a digital video signal (of a band typically ranging from 3 to 13 Mbit/s) over a number (usually between 2 and 8) of transmission links at 2 Mbit/s. It is however understood that the scope of the invention is not limited to this specific example of application.

Since the individual streams propagate along a transmission network, they generally undergo different delays. At the reception side the need then arises of bundling them again so as to correctly restore the original digital stream.

The present invention aims at solving this problem in a particularly simple way, without requiring the use—in particular at the level of the end interfaces of the links—of complex and expensive system architectures.

According to the present invention, this aim is achieved by virtue of a method having the characteristics specifically mentioned in the following claims. The invention also concerns a device for implementing the method.

Figure 1:
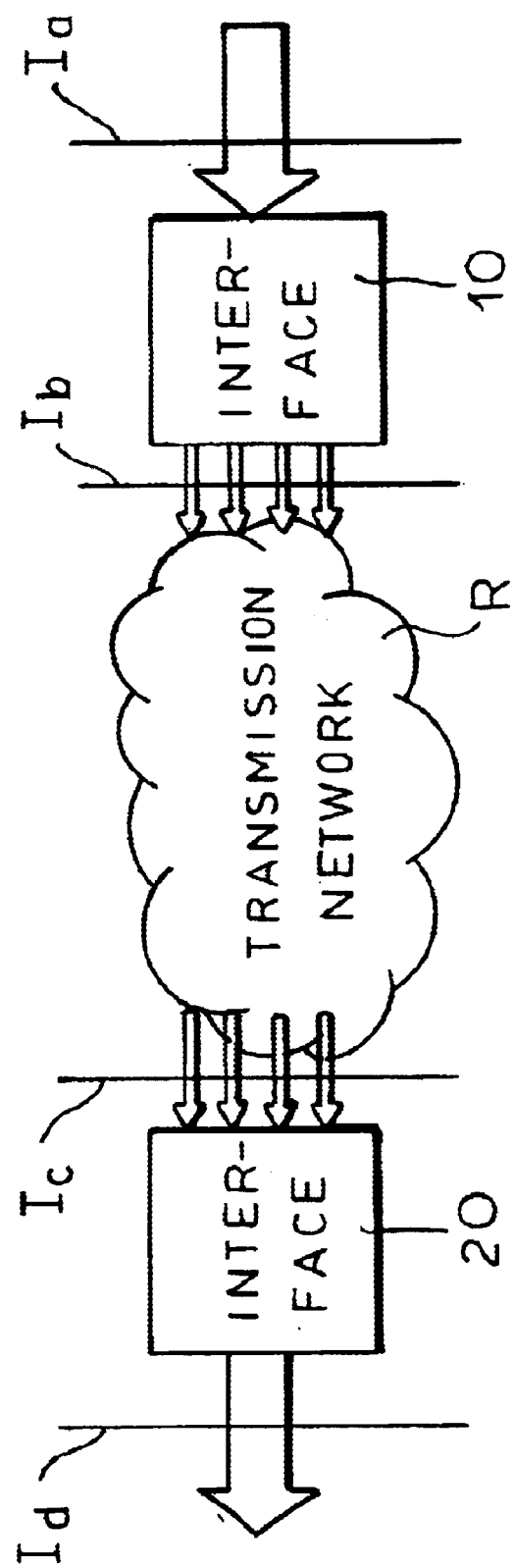
Figure 4:
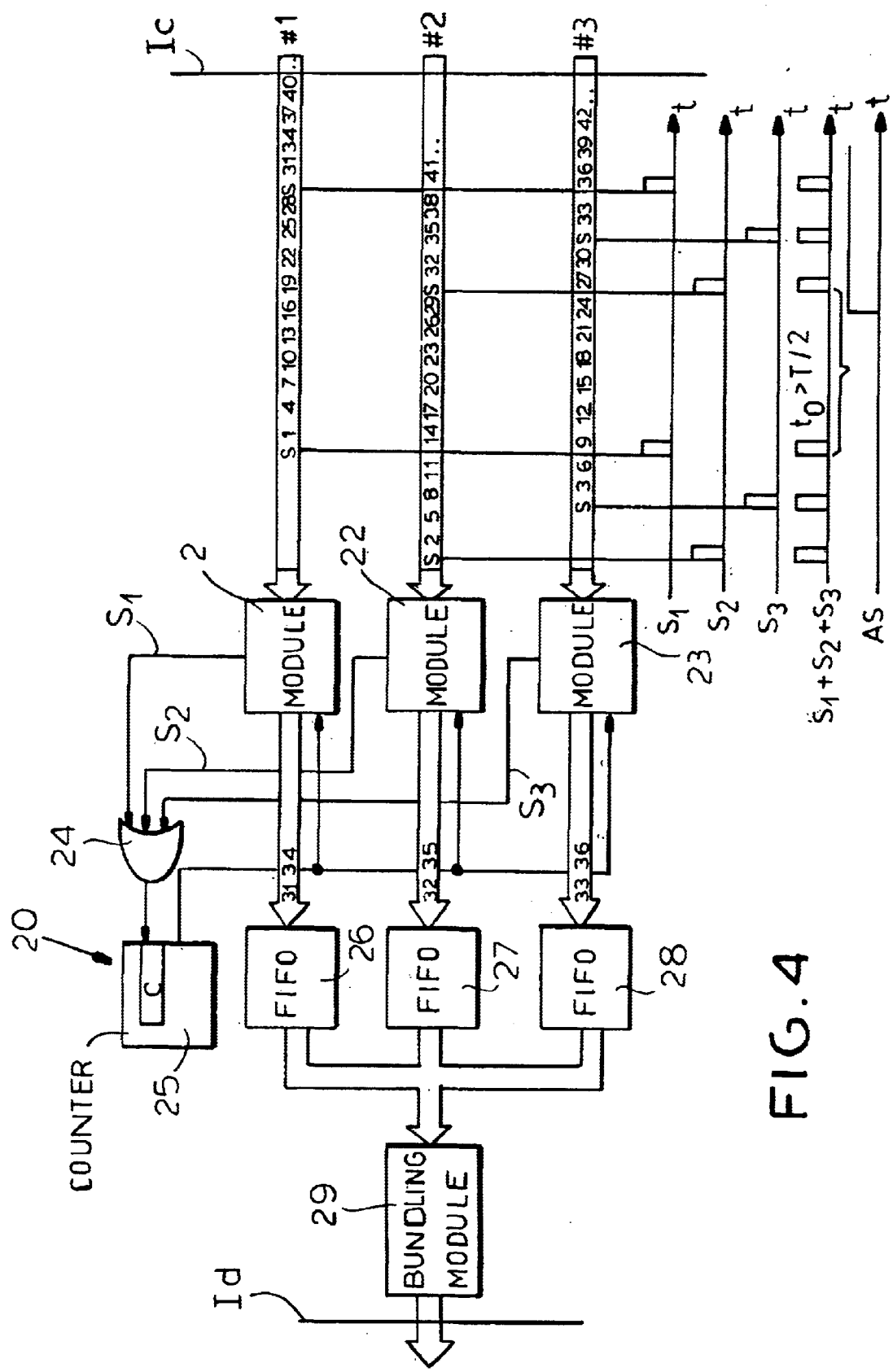
Figure 5:
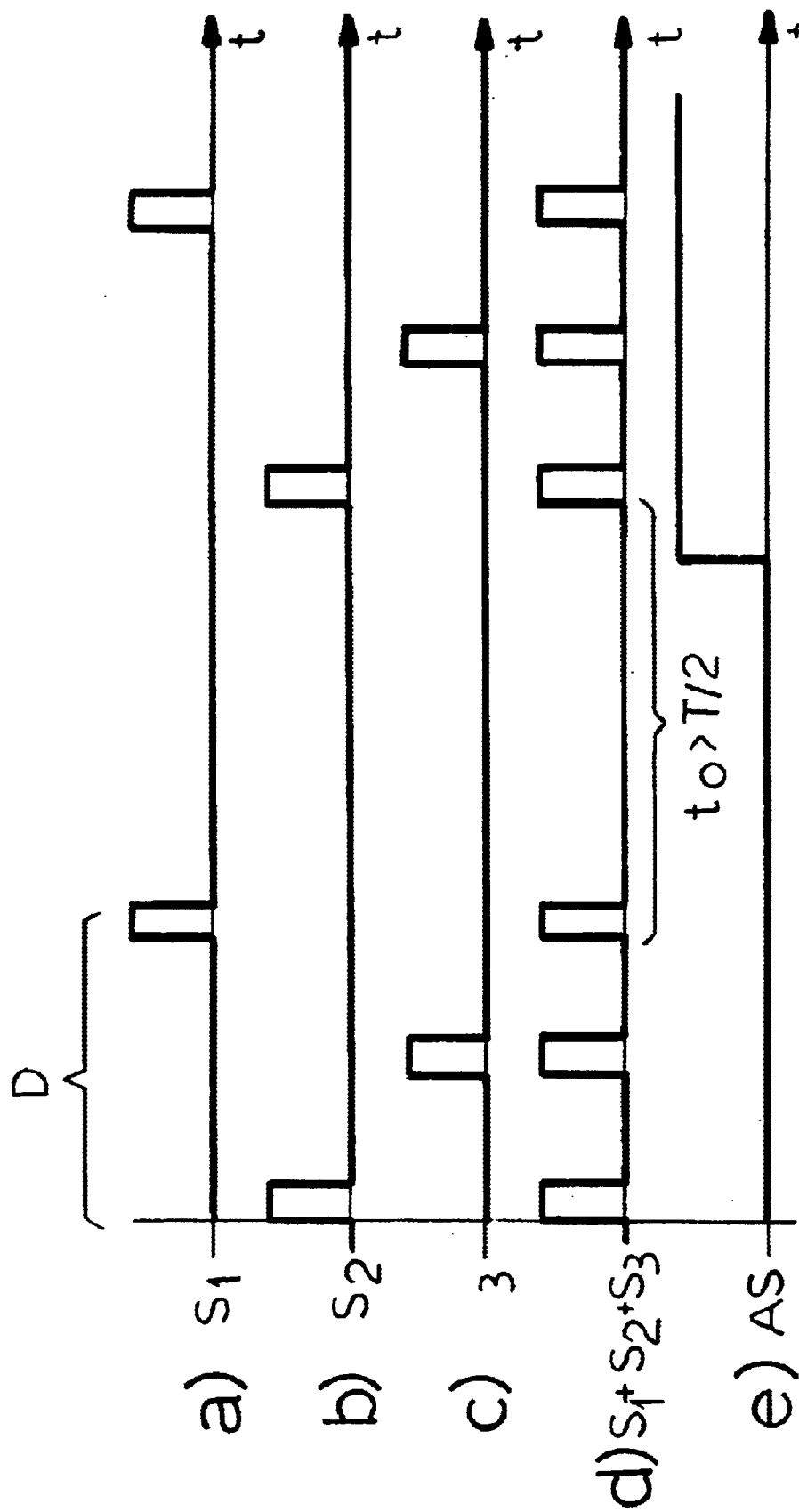

The invention will now be described purely by way of a non-limiting example with reference to the accompanying drawings, wherein:

FIG. 1 shows the application environment of the invention in general terms,

FIG. 2 schematically depicts the criteria adopted in the solution according to the invention at the transmission level, FIG. 3 schematically depicts the criteria adopted in the solution according to the invention at the reception level, FIG. 4 shows in more detail and, in the form of a block diagram, the possible organisation of a receiving device to be used in the invention, and FIG. 5 which comprises five time diagrams 5a, 5b, 5c, 5d and 5e arranged one above the other, shows the typical time behaviour of signals present on the device of FIG. 4.

With reference to the diagram of FIG. 1, the solution according to the invention essentially starts from a digital incoming stream $I_a$ (for instance, an MPEG video stream). Through an inverse multiplexing operation effected in a corresponding interface 10, the incoming stream is converted into a plurality of digital derived streams $I_b$ at lower bit rate transmitted over a respective plurality of links through a transmission network R of any known type.

The links are assumed in the sequel to be equal in terms of bandwidth. Though each of them has an individual bandwidth lower than that of the stream $I_a$, the links guarantee on the whole the availability of a pass band sufficient for the transmission of the incoming stream $I_a$. By way of an example, the network R may be a conventional public network at 2 Mbit/s, where the transmission is organised according to ITU-T recommendations G.703, G 704.

At the input of a reception interface 20 there is a set of received streams $I_c$ virtually identical to the set of the streams $I_b$, but actually modified owing to the different delays suffered by the individual streams, during propagation through the network R. The function of reception interface 20 is to rebuild, starting from the set of streams $I_c$ an outgoing stream $I_d$ virtually identical to the incoming stream $I_a$.

FIG. 2 schematically shows the operation of the interface 10. For simplicity, it has been assumed here that the inverse multiplexing operation is performed by generating, starting from the incoming stream $I_a$, three derived streams denoted by #1, #2 and #3. Further, it has been assumed here that the digital incoming stream is a continuous byte sequence (the bytes being identified by a respective serial number in the Figures, for sake of clarity), presented at the input of the interface 10 at a rate equal to the sum of the rates available on the transmission links being used Different solutions are known in the technique to meet this requirement. Since these solutions are well known and as such they are not critical for the purposes of implementing of the invention, a detailed description is not required here. Merely by way of an example, the possibility is mentioned here of inserting the digital stream into ATM cells, leaving to the ATM convergence level the task of generating the filling cells required to obtain the rate of the stream $I_a$.

In the exemplary embodiment shown, it has been assumed that the individual incoming bytes are cyclically distributed over the outgoing links in a sequential way.

An important feature of the invention lies in the fact that the interface 10 simultaneously inserts into all the streams, with a constant periodicity T, a symbol, denoted by S in FIG. 2 and consisting of a byte or in general of a bit strings, so as to subdivide the transmitted information into time-aligned packets of a same duration.

Of course, this operation takes for granted that the streams are structured in such a way as to allow distinguishing at their inside the strings S from the other information carried, without imposing a restriction to the values that the latter may take. The mutual positions of the strings S must not vary during the propagation along the transmission network R. Also in this case, the possible solutions to meet these constraints are dependent on particular implementations of the method. It is also required that all the transmission streams are mutually synchronous: this may be obtained for instance by generating them starting from a common timing signal.

As an example, in the case of transmissions over networks such as those mentioned above, for the insertion of the strings S one can use a time slot reserved to service information, for instance the time slot TS 16. This solution, though preferential, is evidently not binding for the implementation of the invention.

The representation of FIG. 3 schematically shows the effect of the propagation over the network R on the various derived streams #1, #2, and #3. In the essence, the most significant effect is that, since the respective transmission links give rise to different propagation times through the network, the relating streams suffer different delays. In the exemplary embodiment shown here, the stream #2 precedes the stream #3 by a time interval (here assumed to be equal to the transmission time of two bytes, but it is obviously an example). Stream #3 in turn precedes the stream #1 by a time interval of the same duration.

Though being simultaneously transmitted, the three streams under question are thus distributed in time over a time interval assumed to have duration D.

Nevertheless, assuming that T (i.e. the interval corresponding to the periodicity of insertion of the strings S into the streams #1, #2, #3) is such that D is smaller than T/2, it is always possible to identify a time interval $t_o$ of a duration greater than T/2, during which no strings or symbols S are received. At the end of each interval $t_o$, the first symbol S received arrives from the link that imposes the minimum delay. The symbols S received immediately later, on the other links, precede information bytes which are consecutive and belong to packets initially transmitted at the same instant by the interface 10.

In the example of FIG. 3, starting from any instant in the interval $t_o$, the bytes received after the symbols S of the various streams are, in the order, bytes 32, 33, and 31 respectively.

In the diagram of FIG. 4, illustrating the internal organisation of the reception interface 20, references 21, 22 and 23 essentially denote three alignment modules, each receiving at its input a respective stream #1, #2 and #3. The modules 21, 22 and 23 are configured (in a known way) so as to be able to recognise the symbols S and to emit, at the reception instant of any of such symbols, a corresponding pulse signal $S_1$, $S_2$, and $S_3$. The behaviours of these signals are schematically depicted in the time diagrams of FIGS. 5a, 5b, and 5c, shown for the sake of clarity also in FIG. 4.

In the example considered here, in which the symbols S are transmitted in a predefined time slot, the recognition exploits the conventional timing signals relating to the transmission, not shown.

The signals $S_i$ (i=1, 2, 3) are processed to identify the interval $t_o$ (FIG. 3). This is obtained by feeding the above signals $S_i$ to a logic OR gate 24. The output of gate 24 (which passes to a "high" level whenever a signal $S_i$ is generated) resets a counter 25 capable of reaching a predetermined threshold (in practice, a pre-set count) only during the interval $t_o$. It is therefore evident that such count is not attained during the interval denoted by D in FIG. 3. As a matter of fact, D is the time interval in which the signals $S_i$ identifying the arrival of the symbols S are generated one after the other. In this respect, reference may also be made to the time diagram of FIG. 5d.

The output of the counter 25 is a signal AS (see the time diagram of FIG. 5e) that passes to a "high" logical level, thus enabling the modules 21, 22, and 23 to load the streams of incoming bytes, only near the end of the interval $t_o$. The actual writing of the streams into the modules 21 to 23 will start from the byte immediately following the first symbol S received after the enabling.

References 26, 27 and 28 indicate three additional receiving modules essentially formed by three FIFO memories. Reading from the memories 26, 27 and 28 is enabled only at the instant in which writing in all the alignment modules 21, 22 and 23 is started, with the addition of a possible additional delay to compensate (according to known criteria) possible jitter and wander phenomena introduced by the network R. Thus, reading will start at an instant adequately delayed with respect to the arrival, following the passage of AS to high level, of the first symbol S ($S_1$ in the example), associated to the most delayed stream. The generation of a corresponding signal enabling reading from the memories is well known to the person skilled in the art.

Lastly, reference 29 shows a bundling module that loads the outputs of the memories 26, 27 and 28 according to the same logic of alternation utilised during the transmission. The overall result is the building of the outgoing stream $I_d$ performed by meeting the sequential incoming order. The differences in the propagation times through the network R are in fact absorbed due to the re-alignment action performed in the modules 21 to 23.

It is evident that the symbols S are not written into the memories 26, 27 and 28.

Thanks to the use of FIFO memories the solution according to the invention also allows compensating phenomena which may lead to a different time order of the different streams #1, #2, #3 within the interval D over which said information streams are distributed due to the propagation along the network R.

Obviously, while the principle of the invention remains unchanged, the implementation details and the embodiments may be widely modified with respect to what described and illustrated above, without departing from the scope of the invention, so as will be defined by the following claims.

We claim:

1. A method of transmitting digital signals, wherein a stream of incoming digital signals ($I_a$) is subdivided into a plurality of derived streams ($I_b$) to be transmitted on respective transmission links (R) and the derived streams so transmitted ($I_c$) are bundled again at a reception end to form a stream of outgoing digital signals ($I_d$), comprising the operations of:

inserting into said derived streams ($I_b$), simultaneously and with constant periodicity (T), symbols (S) that subdivide the information transmitted on said transmission links into packets of a same duration and time aligned during transmission, the duration of said constant periodicity being at least twice a maximum time shift (D) between transmitted derived streams ($I_c$), recognizing at said reception end said symbols (S) within said transmitted derived streams ($I_c$), the symbols associated to different derived streams being in general mutually time-shifted due to the transmission on said transmission link, recovering the time alignment of the information packets present in said transmitted derived streams ($I_c$) by recovering the time alignment of the respective symbols (S), and bundling again the transmitted derived streams ($I_c$) after having recovered the time alignment of the respective information packets.

2. The method according to claim 1 wherein said symbols (S) are strings of bits, such as bytes.

3. The method according to claim 1 which comprises the operation of subdividing said incoming stream ($I_a$) into said derived streams ($I_b$) through a given law of sequential time distribution, and the operation of rebundling said transmitted derived streams ($I_c$) after having recovered their time alignment, according to an identical law of sequential time distribution.

4. The method according to claim 1 which comprises the operations of:

detecting, within the set of said transmitted derived streams ($I_c$), at least one interval of a longer duration than said predetermined duration (D), in which said symbols (S) are absent, and receiving each derived stream transmitted ($I_c$) starting from the first symbol (S) are received after said interval of absence of said symbols (S).

5. A device for the transmission of digital signals, comprising:

at a transmitting end, means (10) for subdividing a stream of incoming digital signals ($I_a$) into a plurality of derived streams ($I_b$) to be transmitted on respective transmission links (R) and, at a receiving end, means (20; 21 to 29) for receiving the derived streams and bundling them again into a stream of outgoing digital signals ($I_d$), wherein said subdividing means (10) are arranged to insert into said derived streams ($I_b$), simultaneously and with constant periodicity (T), symbols (S) that subdivide the information transmitted on said transmission links into packets of a same duration and time aligned during transmission, and said receiving and bundling means (20, 21 to 29) comprise control means (24, 25) responsive to said symbols (S) and capable of generating an enabling signal (AS) to enable said receiving and bundling means (20, 21 to 29) to the ordered reception of said transmitted derived streams ($I_c$) in a time-aligned condition as a function of the time alignment of the symbols (S) detected within said transmitted derived streams ($I_c$), said control means (24, 25) comprise timing means (25) capable of identifying a time interval ($t_o$) in which no said symbol is received for the set of said transmitted derived streams ($I_c$), and said timing devices (25) selectively enabling first receiver modules (21 to 23) in said receiving and bundling means (20, 21 to 29) to load said transmitted derived streams ($I_c$) at the end of such absence interval.

6. The device according to claim 5 wherein said receiving and bundling means comprise:

said first receiver modules (21, 22, 23), capable of detecting said symbols (S) present in said transmitted derived streams ($I_c$) and of generating respective recognition signals (S1, S2, S3), and second receiver modules (26, 27, 28), capable of receiving said transmitted derived streams ($I_c$) starting from said first receiver modules (21, 22, 23) and configured as storage units selectively enabled to load the transmitted derived streams ($I_c$) received from said first receiver modules (21, 22, 23) according to a First-In First-Out (FIFO) logic.

7. The device according to claim 6 wherein said control means (25) are arranged to enable (AS) the passage of said transmitted derived streams ($I_c$) from said first receiver modules (21 to 23) to said second receiver modules (26 to 28) in a condition in which the time alignment of said transmitted derived streams ($I_c$) has been recovered by mutually re-aligning the symbols (S) associated to said transmitted streams ($I_c$).

8. A device for the transmission of digital signals, comprising:

at a transmitting end, a transmission interface for subdividing a stream of incoming digital signals ($I_a$) into a plurality of derived streams ($I_b$) to be transmitted on respective transmission links (R) and, at a receiving end, a reception interface for receiving the derived streams and bundling them again into a stream of outgoing digital signals ($I_d$) wherein said transmission interface is arranged to insert into said derived streams ($I_b$), simultaneously and with constant periodicity (T). symbols (S) that subdivide the information transmitted on said transmission links into packets of a same duration and time aligned during transmission, and, said reception interface comprise a logic circuit responsive to said symbols (S) and capable of generating an enabling signal (AS) to enable said reception interface to the ordered reception of said transmitted derived streams ($I_c$) in a time-aligned condition as a function of the time alignment of the symbols (S) detected within said transmitted derived streams ($I_c$);

said logic circuit comprising a timing device capable of identifying a time interval ($t_o$) in which no said symbol is received for the set of said transmitted derived streams ($I_c$);

said timing device selectively enabling first receiver modules in said reception interface to load said transmitted derived streams ($I_c$) at the end of said absence interval.

9. The device according to claim 8 wherein said timing device is capable of identifying a time interval ($t_o$) in which no said symbol is received for the set of said transmitted derived streams ($I_c$) and of selectively enabling first receiver modules in said reception interface to load said transmitted derived streams ($I_c$) at the end of said absence interval.

10. The device according to claim 9 wherein said reception interface comprises:

said first receiver modules capable of detecting said symbols (S) present in said transmitted derived streams ($I_c$) and-of generating respective recognition signals (S,–S,. S3), and second receiver modules capable of receiving said transmitted derived streams ($I_c$) starting from said first receiver modules and configured as storage units selectively enabled to load the transmitted derived streams ($I_c$) received from said first receiver modules according to a First-In First-Out FIFO logic.

11. The device according to claim 10, wherein said logic circuit is arranged to enable (AS) the passage of said transmitted derived streams ($I_c$) from said first receiver modules to said second receiver modules in a condition in which the time alignment of said transmitted derived streams ($I_c$) has been recovered by mutually re-aligning the symbols (S) associated to said transmitted streams ($I_c$).

* * * * *